(12) United States Patent
Bortolussi et al.

(10) Patent No.: US 9,265,203 B2
(45) Date of Patent: Feb. 23, 2016

(54) FASTENING DEVICE FOR MOVABLE WIRES ON A ROW OF PLANTS

(76) Inventors: Claudio Bortolussi, Pordenone (IT); Franco Bortolussi, Pordenone (IT)

(*) Notice: Subject to any disclaimer, the term of this patent is extended or adjusted under 35 U.S.C. 154(b) by 153 days.

(21) Appl. No.: 13/500,694

(22) PCT Filed: Mar. 31, 2011

(86) PCT No.: PCT/EP2011/055027
§ 371 (c)(1),
(2), (4) Date: Apr. 6, 2012

(87) PCT Pub. No.: WO2011/131468
PCT Pub. Date: Oct. 27, 2011

(65) Prior Publication Data
US 2013/0042525 A1  Feb. 21, 2013

(30) Foreign Application Priority Data

Apr. 23, 2010 (IT) .............................. PN2010A0023

(51) Int. Cl.
*A01G 17/14* (2006.01)
*A01G 17/06* (2006.01)

(52) U.S. Cl.
CPC ................ *A01G 17/06* (2013.01); *A01G 17/14* (2013.01)

(58) Field of Classification Search
CPC ....... A01G 17/04; A01G 17/06; A01G 9/126; E04H 17/12; E04H 17/04; E04H 17/02; E04H 17/06; E04H 17/063; E04H 17/08; E04H 17/1417; E04H 17/1421; E04H 17/22

USPC ............ 47/46, 47, 70, 1.01 S, 44; 256/32, 35, 256/36, 37, 41, 42–44, 52–53, 47–48, 54, 256/65.04

See application file for complete search history.

(56) References Cited

U.S. PATENT DOCUMENTS

| | | | | |
|---|---|---|---|---|
| 1,480,917 A | * | 1/1924 | Robinson | 47/44 |
| 3,949,968 A | * | 4/1976 | Verhelst | 254/213 |
| 4,433,831 A | * | 2/1984 | Bunger | 256/39 |

(Continued)

FOREIGN PATENT DOCUMENTS

| | | |
|---|---|---|
| FR | 2883127 | 9/2006 |
| WO | 2005/048691 | 6/2005 |

*Primary Examiner* — Joshua Huson
(74) *Attorney, Agent, or Firm* — Davis & Bujold PLLC; Michael J. Bujold

(57) ABSTRACT

The present invention relates to a device for fastening movable wires on a row of plants, in particular grape vines.

A fastening device for movable wires (F', F") of a row of plants according to the invention includes connecting means (1, 201, 301, 401) suitable to arrange said device in proximity of a head pole (PE) of said row, guide means (2) and a plurality of mounting means (3) of a wire slidingly connected to said guide means (2). The device is characterized in that said guide means (2) include a plurality of guide portions (4A, 4B, 4C, 4D) that define a corresponding plurality of displacement paths of said movable wires (F', F") distributed on opposite sides of the row, said displacement paths being oriented transversally relative to the direction of extension of said movable wires (F', F"), and in that said mounting means (3) are designed to receive a single movable wire (F', F") so that each one of said movable wires (F', F") is independently displaceable along one of said displacement paths.

11 Claims, 11 Drawing Sheets

(56) References Cited

U.S. PATENT DOCUMENTS

| | | | |
|---|---|---|---|
| 7,571,567 B2 * | 8/2009 | Bortolussi | 47/46 |
| 2002/0112400 A1 * | 8/2002 | Fidler | 47/46 |
| 2003/0097788 A1 | 5/2003 | Pierce | |
| 2005/0252076 A1 * | 11/2005 | Schloesser et al. | 47/46 |
| 2007/0173132 A1 * | 7/2007 | Bortolussi | 439/676 |
| 2009/0277083 A1 * | 11/2009 | Barnes | 47/46 |
| 2010/0229463 A1 * | 9/2010 | DeBruin | 47/46 |
| 2011/0154731 A1 * | 6/2011 | Schaeffer | 47/45 |

* cited by examiner

FASTENING DEVICE FOR MOVABLE WIRES ON A ROW OF PLANTS

The present invention relates to a device for fastening movable wires on a row of plants, in particular grape vines.

BACKGROUND OF THE INVENTION

In agriculture, and particularly in the viticultural field, a well-known practice is to prearrange plant support structures consisting of rows of poles driven into the ground so as to form rows. The poles are spaced apart and are interconnected in their parts above ground by a horizontal wire, called "carrying or training wire", that is secured on said poles at a suitable height above the ground. On the two poles that are placed at the ends of each row, called "head poles", are also fastened at least one pair of wires parallel to each other and arranged on respective sides of each pole in the row. These wires are commonly called "containment wires" or "movable wires" because, during the different phases of cultivation of the plants, they are moved to different heights above the ground to contain and arrange the growing canopy according to a desired configuration. In winter, in fact, when the vine shoots are very short or are completely absent, the pairs of movable wires are arranged in a position closer to the ground. In the spring and summer seasons, when the plants are in full growth, each pair of movable wires is progressively moved to a position farther from the ground in the direction orthogonal to the ground, to contain the canopy between the wires of each pair, thus making it grow according to a desired configuration.

According to a well-known method, at least one of the ends of the movable wires is fastened to a head pole on the row by means of metal chains provided with a suitable coupling device or suitable clamps, which were used to fasten one of the chain links to the pole. With that fastening solution, when it is necessary to move each movable wire to another position, the wire must first be loosened by uncoupling the relative chain from the pole, then repositioning the movable wire at the desired height, and finally coupling the chain back on the pole. These operations, all of them fairly complex and strenuous, require the presence of at least two persons, one to support the chain while keeping the movable wire taut, and at least another person to move the movable wire to a new position. Thus it is evident, especially considering the fact that on a tilled land the rows are numerous and of considerable length, that such a fastening configuration of the movable wires on a head pole of a row of vines involves a considerable amount of physical labour and relatively long working times and considerable costs.

As a partial improvement of the chain-based fastening method, in the International Patent Application WO 2005/048691, is disclosed an elastic compensation device that makes it possible for a single person to vertically reposition each movable wire. According to this embodiment, at least one end of each movable wire is coupled to a first end of an elastic compensation device stably fixed to the head pole in the row.

A drawback of this solution lies in the fact that the vertical change of position of the movable wire to place it at a different height with respect to the height at which the two ends on the head poles are fastened, involves the formation of a portion of movable wire that is placed obliquely with respect to the ground in the region included between each head pole and the first pole in the row down from said head pole. This is due to the fact that the change in the height of the movable wire applied manually does not include the ends of the same wire, which remain in a fixed position on the head poles. This oblique positioning of the movable wire with respect to the ground into which the poles are driven determines the substantial impossibility of managing in the best manner the canopy growing from one or more plants placed in the area of the ground included between each head pole and the next pole down the row. It is thus evident that, although a row can theoretically accommodate plants, in particular grape vines, spaced at a distance of about 80 cm from each other, the solution of fastening the movable wires to the head poles disclosed in WO 2005/048691 implies substantially the need to place the first plant in a row at a distance greater than 1.5 meters from the head pole on which the device is fastened, in other words beyond the first pole in the row after the head pole. Thus it can be seen that, for each row which naturally includes two head poles, in order to train the plant growth in the best manner, it is necessary to give up planting at least one pair of extra vines over the number that could theoretically be accommodated by the row if they were spaced at a distance of about 80 cm from each other. In particular, in a field planted with grape vines, even if they are of relatively small size, the number of plants that must be given up planting can be a considerable disadvantage, with a consequent loss in the yield of the vineyard.

As a partial solution of the shortcomings outlined above, Italian Patent IT 1364354 discloses an adjustable and transferable tensioning system of the mobile wires, wherein at least one pair of wire tensioners are slidingly coupled to each of the two head poles. Each wire tensioning device supports two mobile wires arranged parallel to and at a short distance from each other so as to be placed on the sides of the intermediate poles in the row in order to properly train the plant growth. This system has considerable disadvantages, both in terms of the method of vertical displacement of the mobile wires and in terms of the limitations it imposes on the arrangement of a row of plants, in particular grape vines. A first one of these shortcomings lies in the fact that the vertical displacement of the mobile wires can be carried out only by simultaneously moving two mobile wires having their corresponding ends mounted on the same wire-tensioning devices. In actual practice, in fact, the simultaneous displacement of a pair of mobile wires and of the relative wire-tensioning devices is strongly hindered by the presence of the grown canopy, whose casual arrangement makes it difficult to contain it between two parallel mobile wires moved vertically at the same moment. In the system disclosed in IT 1364354, a further problem in the displacement of each pair of mobile wires is due to the high friction present between each wire-tensioning device and the head pole or the relative sliding guide on which it is mounted, which results disadvantageously in the necessity of using a particular tool to pry the device away from the pole. In addition to the friction between the contact surfaces, the tension imposed by the same wire-tensioning devices on each pair of mobile wires also hinders the vertical displacement of the latter. In addition, the fact that the operation of changing the vertical position of the mobile wires involves the simultaneous displacement of two wires that are coupled to the same wire-tensioning device and that are at least in part obstructed by the canopy, contributes, together with the problems described above, to making the operations of changing the position of the mobile wires laborious and complicated.

Still another shortcoming of the system disclosed in IT 1364354 lies in the fact that the vertical displacement of each pair of mobile wires is limited by the presence of the carrying wires in the row that extend longitudinally between all the intermediate poles in the row, starting from the two head poles, and whose position is definitively determined the moment when the row is arranged. In fact, since each pair of movable wires is secured to the same wire-tensioning device, the range of vertical movement of the latter cannot include within it the presence of any carrying wire and of the relative fastening mechanism on the head pole. Thus, in a row of grape vines, the adjustable and translatable tensioning system for the mobile wires proposed in IT 1364354, which naturally must take into account the normal heights of the plants on which the canopy to be trained grows, imposes the disadvantage of arranging each carrying wire above the highest position or below the lowest position in which it is possible to place each pair of mobile wires by sliding the relative wire-tensioning device on the head pole. This implies the necessity of using poles whose part above ground is rather high or, to limit that height, limiting the vertical distance that each pair of mobile wires may travel, with the risk that it may not be possible to effectively contain part of the canopy. Similarly to what previously described with reference to the fastening of the mobile wires using means of elastic compensation, a further disadvantage of the positioning requirements of the system disclosed in IT 1364354 with respect to the carrying wires in the row lies in the fact that the canopy growing from the vines present in the region between each head pole and the first pole on the row after the head pole cannot be easily contained by varying the position of the mobile wires, but must be disadvantageously trained on said mobile wires through laborious manual operations. In fact, according to what is disclosed in IT 1364354, at the beginning of the first phase of vegetation growth, in the region included between each head pole and the first pole in the row after the head pole, the movable wires are arranged obliquely relative to the ground, and, especially in the area proximate the head pole, they are arranged at a higher level than the fruiting canes on the plants. This arrangement allows the canopy to grow in casual configurations that position themselves outside of the area included between each pair of movable wires arranged on opposite sides of the row, thus avoiding being contained when the movable wires are being displaced vertically.

A not less significant disadvantage of the system disclosed in IT 1354354 consists of the fact that the displacement of each pair of movable wires implies the displacement of at least a further pair of wires supported on the same head poles, since said system does not allow a first pair of wires placed at a lower height to be displaced in height along the head pole and be moved past, or above, a second pair of wires placed at a higher level relative to the first pair of wires. In other words, since the training system proposed in IT 1364354 provides for mounting on a single vertical guide all the wire-tensioning devices that fasten the movable wires, when it becomes necessary to move said wires to a higher level in order to contain the grown canopy, before moving to a higher level a first wire-tensioning device located nearer to the top of the head pole it is necessary to move to a higher level a second wire-tensioning device that is located immediately below the first device until it is substantially moved up to the position occupied by the first device. Only after the second device has substantially taken the place of the first device, the latter can be lifted higher along the head pole. This double displacement, and in particular the displacement of the movable wires that in the course of the seasonal growth of the canopy have first curbed the vegetation, causes the breaking of the tendrils that anchor the vine shoots to the movable wires, thus irreparably damaging the vine. This problem is particularly sensitive for some types of grape vines that produce slender and easily breakable shoots.

SUMMARY OF THE INVENTION

An objective of the present invention is therefore to provide a fastening device for movable wires of a row of plants, in particular grape vines, that resolves the shortcomings and the disadvantages of the devices of known type.

In the scope of the above objective, one purpose of the present invention is to provide a fastening device for movable wires on a row of plants that can be easily and rapidly installed on a head pole of a row of plants, the same device being capable of receiving a tensioning and/or elastic compensation means, that is easy to use and readily installable on the wire fastening device.

Another objective of the present invention is to provide a fastening device for movable wires on a row of plants that enables even a single operator to quickly vary the positioning height of the wires above the ground wherein are driven the poles in the row, said positioning being feasible without the use of any tool and with a limited effort compared to known systems.

A further objective of the present invention is to provide a fastening device for movable wires on a row of plants that is easy to install, even in pre-existing rows that are already provided with movable wires.

A no less important objective of this invention consists of realizing a fastening device for movable wires in a row of plants that makes it possible to move each movable wire independently of all the others, the same device also making it possible for the movable wires placed on the same side of the poles in the row to skip past each other.

A further objective of the present invention is to provide a fastening device for movable wires on a row of plants that makes it possible to best manage the canopy of one or more plants placed in the same portion of land included between each head pole of said row and the first pole down the row from it.

Another objective of the present invention is to provide a fastening device for movable wires on a row of plants that makes it possible to change the height of the wires over a wide range of adjustments and without interfering with the poles in the row or with the carrying wires that extend at a constant height between the two head poles in the row.

One still other objective of the invention is to provide a fastening device for movable wires on a row of plants that reduces the number of operations that an operator is expected to carry out seasonally to contain the canopy growing from said plants during the whole natural growing period.

A further objective of the invention is to provide a fastening device for movable wires on a row of plants that limits the damage that can be caused to plants during the operations of training the canopy.

One not least objective of the invention is to provide a fastening device for movable wires on a row of plants, in particular grape vines, capable of interfacing with different types of elements adapted to induce a state of tension in said wires.

BRIEF DESCRIPTION OF THE DRAWINGS

The above tasks and objectives are achieved by a fastening device for movable wires on a row of plants, in particular grape vines, having the characteristics enunciated in the appended claims. The characteristics and advantages of the invention will be evident from the following description, given by way of non-limiting example, with reference to the enclosed drawings, wherein:

With reference to FIG. 1, it is possible to examine the traditional fastening of the movable wires on a row of plants carried out according to the known art. The row is made up of a plurality of posts arrangement in alignment and spaced apart from each other. As is well known, the poles may consist of suitable elements made of wood, cement, plastic, fibre glass, metal or other material, having cross sections of different shapes and often provided with elements and/or devices for coupling with metal wires. The poles and the ends of the row, called "head poles", are identified with PE and the intermediate ones with PI. On all the poles PE and PI, in correspondence of the fruiting canes on the vines is fastened a first fixed wire FM' and, optionally, at least one second fixed wire FM is fastened between the poles PE and PI at a suitable height above the ground. The fixed wires FM, FM' are also called "carrying or training wires". The head poles are also suitably braced with suitable bracing wires, identified by FC. In the example illustrated in FIG. 1, the ends of the movable wires are fastened to the head poles at a level higher than the fastening height of the training wire FM' by means of elastic compensation devices 1, for example of the type disclosed in WO 2005/048691. To each elastic compensation device 1 is associated a pair of movable wires F which are strung on both sides of the intermediate poles PI. Thanks to the elasticity of the compensation devices 1, the movable wires F can be fastened with simple coupling operations to suitable coupling elements G formed or applied on the relative intermediate poles PI, so as to result positioned at different heights from the ground. To highlight the different possible positions of the movable wires F, a numerical symbol has been added to the common reference F; in addition, the single position of the wire F3 is indicated with a continuous line, while the others, and specifically the positions of the two lower movable wires and the one of the wire above the wire F3 are shown with broken lines and with the references F1, F2 and F4, respectively.

Figure 1:
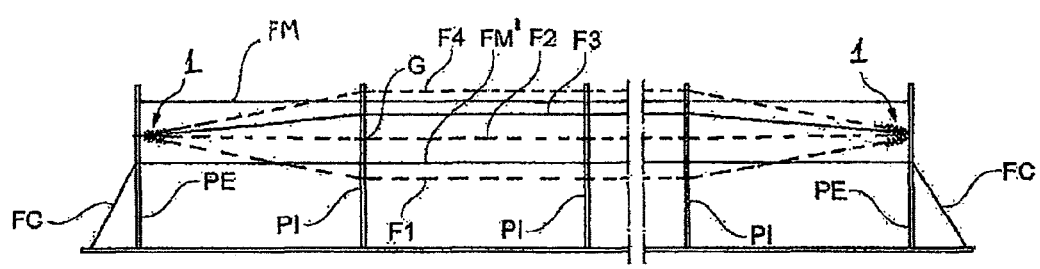
FIG. 1 schematically illustrates a typical fastening of the movable wires in a row according to the known art.

From FIG. 1, it is evident that the movable wires F1, F3 and F4, strung at a height different from the one to which the two ends are fastened (position of wire F2), are oriented in an oblique manner relative to the ground in the regions of the row included between each head pole PE and the first intermediate pole PI. In these regions of the row, the movable wires F contain with great difficulty, and at any rate only in part, the canopy grown from the vines rooted in said regions, especially if they are located in a position near the head pole. Since the growth of vegetation of the plants in that region cannot be controlled completely or in part, there is the necessity of resorting to a manual binding of the vegetation in the movable wires. The amount of this manual training can become considerable in the case of very extensive plantations, discouraging the planting of vines in the regions of the row included between each head pole PE and the first intermediate pole PI.

With reference to FIGS. from 2 through 8, a device is described for fastening movable wires F', F" on a row of plants, in particular grape vines, built according to the present invention, as well as its function of progressively training the canopy growing from the vines. In the enclosed figures, provided purely by way of illustration, are shown two pairs of movable wires F', F", but it is evident that the invention that will be described hereunder is also applicable when the row of plants requires a single pair of movable wires or more than two pairs of movable wires.

The fastening device for movable wires F', F" according to the invention includes connecting means 1 through which the device can be arranged in proximity of a head pole PE in a row, guide means 2 to which are slidingly associated a plurality of wire mounting means 3. In particular, the guide means 2 comprise guide portions 4A, 4B, 4C and 4D that define a corresponding plurality of displacement paths along which the movable wires F', F" can be displaced by an operator on the two opposite sides of the row to train the canopy progressively growing from the plants. Such displacement paths are oriented transversally relative to the direction of extension of said movable wires F', F", and are preferably oriented perpendicularly to the movable wires F', F". The guide portions 4A, 4B, 4C and 4D are configured so that, when the fastening device is mounted on a head pole PE, they are arranged on opposite sides of the row. For this purpose, the guide portions 4A, 4B, 4C, 4D are set in pairs 4A, 4B and 4C, 4D, wherein each pair is formed by parallel guide portions spaced apart so as to form between them a free space having suitable dimensions to hold a head pole PE and to allow the passage of the fixed or carrying wires FM, FM' that extend longitudinally along the whole length of the row between the two head poles PE.

Since a row of plants, in particular grape vines, is set up with four movable wires F', F" that extend along the sides of the intermediate poles PI in the row and are distributed so that there are two on each side of the row, the guide means 2 of the fastening device according to the invention preferably comprises four guide portions, but naturally, if the row arrangement requires a number of pairs of movable wires F other than two, said fastening device will include a corresponding number of movable portions. For example, if there are only two movable wires F in a row, the guide means 2 may comprise only two guide portions.

In order to effectively manage the canopy that grows from the plants during the whole growing period, the pairs of movable wires F', F" must be positioned at different heights on the head poles. For this purpose, the pairs of guide portions 4A, 4B and 4C, 4D have different lengths. First guide portions 4A, 4C of the two pairs are mounted one beside the other on one side of the row, while second guide portions 4B, 4D of the same pairs are mounted one beside the other on the opposite side of the row in a position symmetrical to the first guide portions 4A, 4C. In the embodiment shown in FIGS. 2 to 4, the shorter guide portions are arranged so as to cover a range of adjustment of the height of the movable wires F in a region proximate to the carrying wire FM' that is nearest the ground. If so preferred, as will be better described hereafter, it is also possible to mount the shorter guide portions so as to cover a range of adjustment of the height of the movable wires F in a region proximate to the carrying wire FM that is farthest from the ground. Advantageously, the guide portions are achieved by using identical structural sections of metal of polymeric material, cut at a suitable length depending on the displacement path desired to apply to each pair of movable wires F', F".

Figure 2:
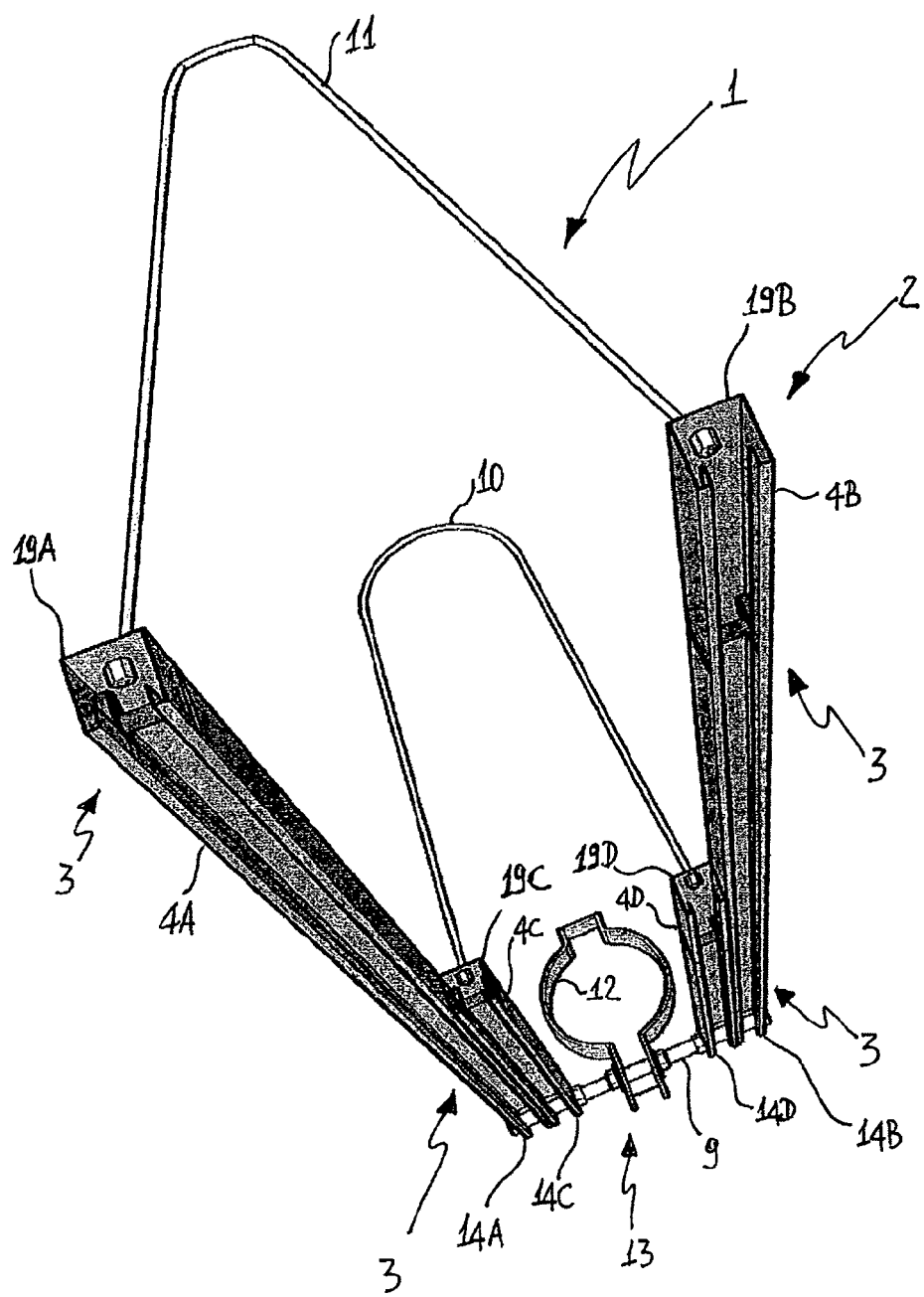
FIG. 2 is a perspective view from above of a first embodiment of the fastening device for movable wires according to the invention.
Figure 3:
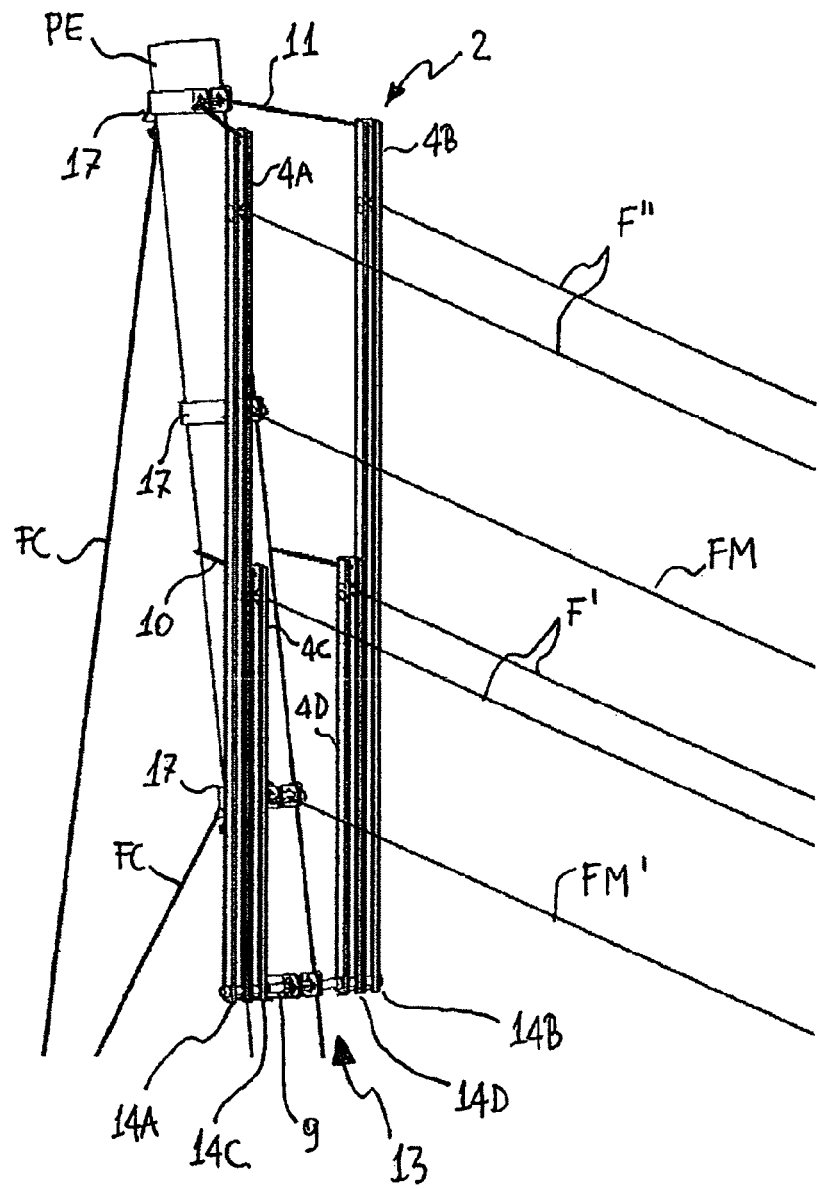
FIG. 3 is a perspective view of the fastening device shown in FIG. 2 mounted on a head pole in a row of plants.
Figure 4:
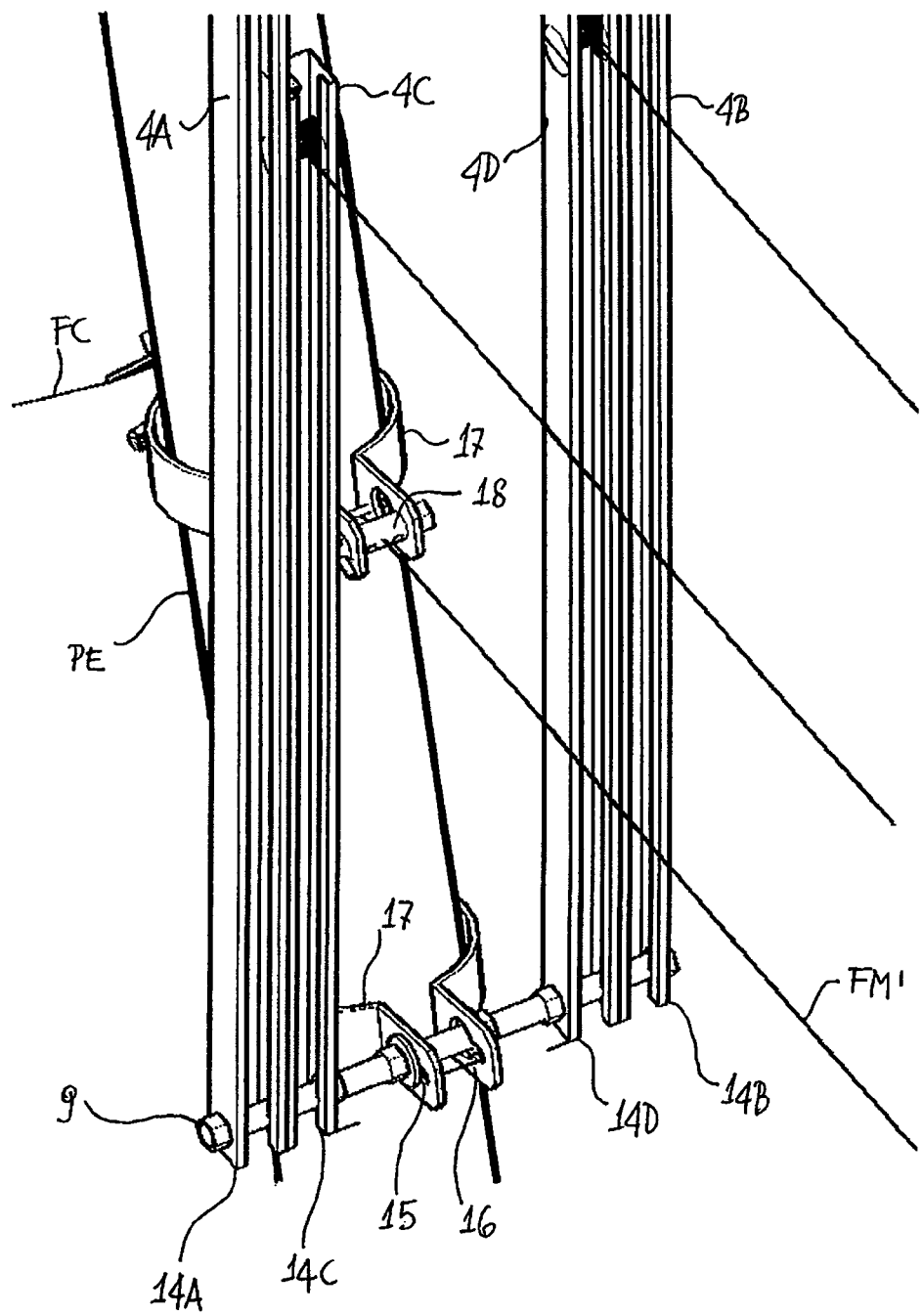
FIG. 4 is a perspective view of the lower portion of the fastening device shown in FIG. 2 mounted on a head pole in a row of plants.

The wire mounting means 3 are slidingly associated to the guide portions 4A, 4B, 4C and 4D, and preferably, as shown in FIGS. 2 to 4, each of said mounting means 3 is connected to a guide portion in such a way that each of them is slidingly movable along a specific displacement path. Naturally, in all its embodiments, it is possible to arrange the fastening device of the invention so that a guide portion 4A, 4B, 4C and 4D accommodates a plurality of mounting means 3. The mounting means 3 are designed to receive a single movable wire F, so that each of said wires F can be independently displaced from the other movable wires. As will be better described hereafter, with an embodiment of this type an operator may effectively change the height of a single movable wire at a time by operating on one of the sides of the row with a rather moderate effort.

Figure 5:
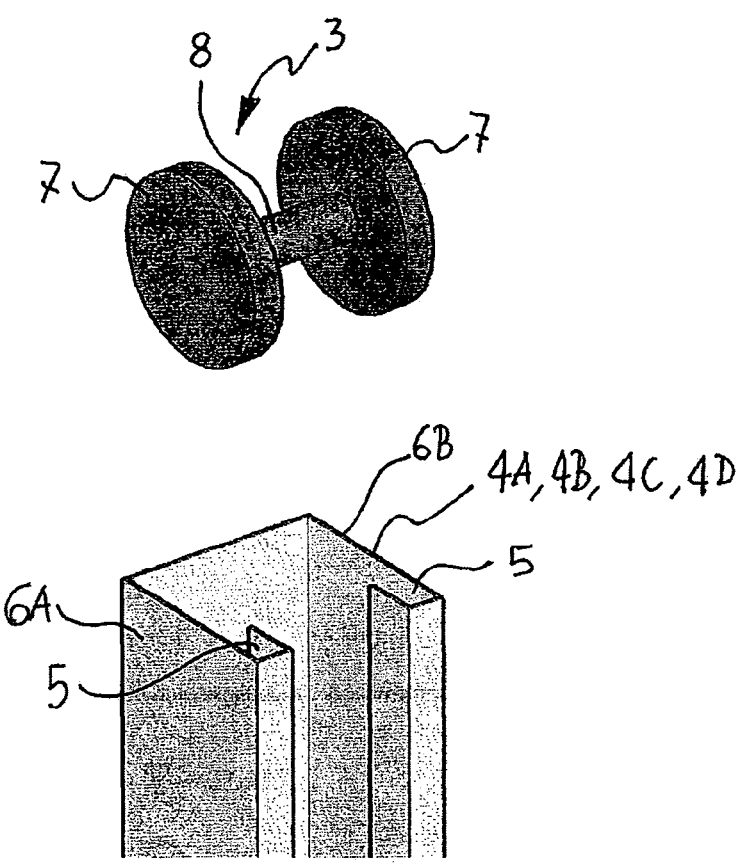
FIG. 5 is a perspective view of a guide portion and of a wire mounting means.

To achieve an effective sliding of the mounting means 3 on the guide means 2, the guide portions 4A, 4B, 4C and 4D are provided with one or more sliding paths 5 (FIG. 5) formed in the structural section that forms said guide portions. These structural sections may, for example, have a U-shaped or a C-shaped cross section, in which the terminal edges of the two facing walls 6A and 6B of the structural section are bent inward to form the sliding paths 5. Naturally, sliding paths having cross sections of different shapes from the above may be equally applied in the scope of the present invention. Thus, for example, it will be possible to use structural sections in which the shape of the outermost surface of their cross section forms one or more sliding paths 5. Examples of such variants are represented by elements with T-shaped, or H-shaped cross sections, or with closed cross sections, such as for example a quadrangular, oval, round or other types of cross sections. Advantageously, the mounting means 3 include rolling members 7 adapted to engage the sliding paths 5. In the illustrative embodiment shown in FIG. 5, the mounting means 3 include a pair of rolling members rollingly coupled to a shaft 8, on which can be received the end of a movable wire F. If so wished, the rolling members 7 may be replaced by sliding bodies, not shown in the figures, that do not roll in the sliding paths 5 but simply slide therein.

The mounting means 3 may also be provided with a wire tensioning device of known type to apply to the movable wire F, which is received by each of said mounting means 3, a state of tension useful to keep the wire F straight in all its extension along the row. An example of such wire-tensioning devices consists of a roller on which the wire can be wound.

The device for fastening movable wires F', F" according to the invention may be fastened to a head pole PE of a row (FIG. 3) through connecting means 1, wherein one portion 13 of the latter is rotatably associated with the guide means 2 to allow an operator to mount them in a position substantially at right angles to the longitudinal extent of the movable wires F', F" along the row. Preferably, the connecting means 1 include a plurality of brackets 9, 10, 11 removably connected to the guide means 2. In particular, the portion 13 rotatably coupled with the guide means 2 is formed by means of a first bracket 9, consisting for example of a pin, that extends transversally to the guide portions 4A, 4B, 4C and 4D in correspondence of a first end of the same 14A, 14B, 14C, 14D, respectively. The middle part of the first bracket 9 is received in a pair of slots 15, 16 formed in a collar 17 designed to be fastened around a head pole PE, as shown in detail in FIG. 4. The bracket 9 is also useful to arrange the guide portions 4A, 4B, 4C and 4D on the two opposite sides of the row, so as to leave between each pair of corresponding guide portions a space for the passage of the carrying wires FM' and FM, which are stably fastened to the head pole PE by means of other collars 17 provided with wire-tensioning rollers 18 as is shown in FIGS. 3 and 4. In these figures, it can be seen that each wire F', F" is movable independently of all the others along the displacement paths defined by the guide portions 4A, 4B, 4C and 4D.

Additional brackets 10, 11 are foreseen to be associated with a head pole PE of the row by placing them directly around the pole or through a further fastening collar 17, which may if necessary be provided with suitable coupling devices to receive a bracing wire FC as shown in FIG. 3.

The mounting means 3 can be inserted into the sliding paths 5 through second ends 19A, 19B, 19C, 19D, respectively opposite the first ends 14A, 14B, 14C, 14D, of the guide portions 4A, 4B, 4C and 4D to be ready to receive the movable wires F', F". Suitable end-of-travel means can be provided on the sliding paths 5 to prevent the mounting means 3 from accidentally coming out of the paths 5 during the displacement of the movable wires. Said end-of-travel means could, for example, consist of pins that intersect the sliding paths 5.

Figure 6:
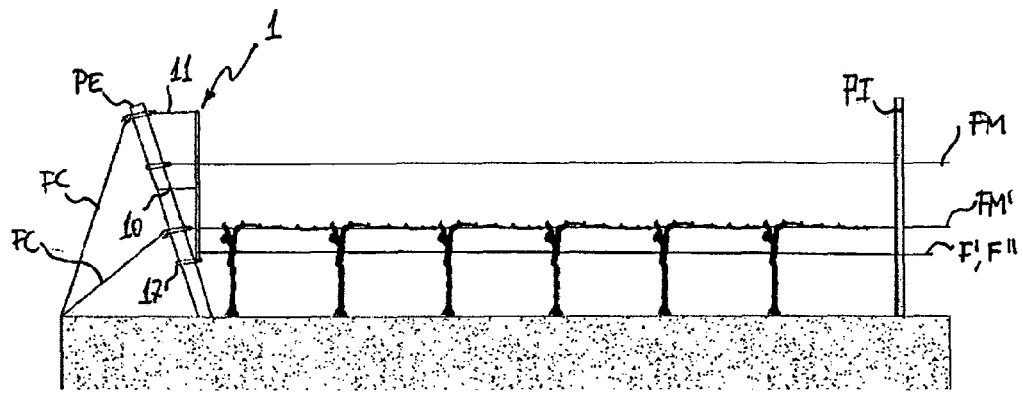
FIG. 6 illustrates the head portion of a row of plants, in particular grape vines, equipped with a fastening device for movable wires according to the present invention in the configuration assumed during the no-growth winter period.
Figure 7:
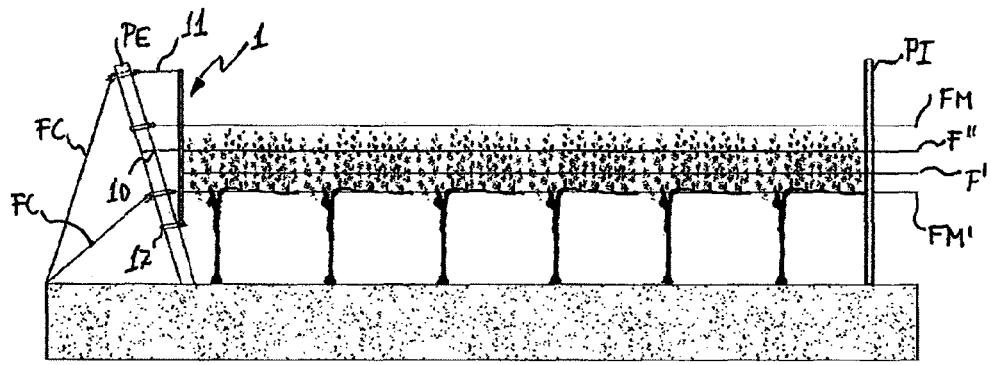
FIG. 7 illustrates the head portion of a row of plants, in particular grape vines, equipped with a fastening device for movable wires according to the present invention in the configuration assumed during the beginning of the vegetation growth period.
Figure 8:
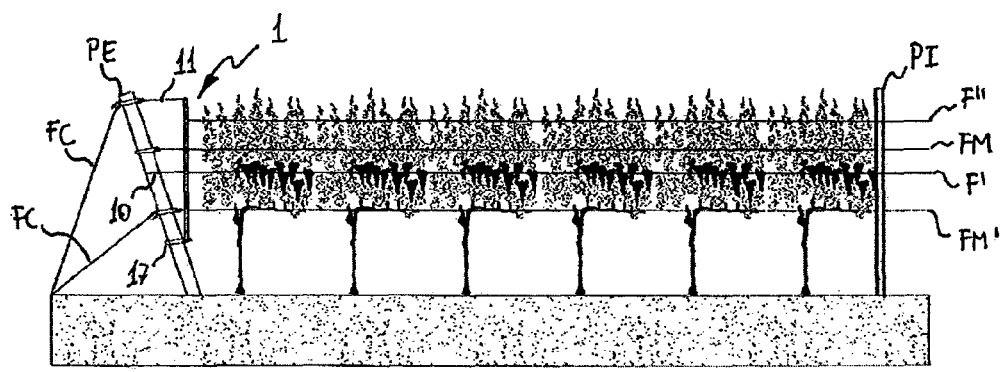
FIG. 8 illustrates the head portion of a row of plants, in particular grape vines, equipped with a fastening device for movable wires according to the present invention in the configuration assumed during the period of maximum plant growth.

FIGS. 6 to 8 show a head portion of a row of plants, in particular grape vines, provided with a fastening device for movable wires F', F" according to the invention in the main phases of plant growth. More in detail, in FIG. 6 the row is in the plant dormant stage typical of the winter period. The pairs of movable wires F' and F" are both arranged in a first position that substantially defines the minimum positioning height of the movable wires, preferably below the training wire FM' of the row installed at the lowest height. As shown in FIG. 7, in the spring period, when the vegetation begins to grow and requires to be trained to increase its subsequent productivity, an operator can continually move the wires F' and F" along the displacement paths defined by the guide portions 4A, 4B, 4C and 4D by operating first on one side of the row and then on the other, moving each movable wire independently of all the others. The displacement of each movable wire can be performed by simply holding a wire and moving it in a direction perpendicular to the ground. This movement will involve a corresponding and immediate movement of the sliding means 3 on the guide means 2. In particular, the wires F' and F" can be placed at a higher level than the carrying wire FM', so as to train the vegetation substantially in proximity of its point of origin on the plant and substantially in proximity of its terminal end. In this manner, the vegetation canopy can be trained in a vertical direction so as to increase the fruitfulness of the plants.

DESCRIPTION OF THE PREFERRED EMBODIMENTS

FIG. 8 shows the row in the condition of maximum plant growth corresponding to the summer period. In this phase of vegetation growth it is necessary to raise the pair of wires F'' to a higher level, that is, to a second position that substantially defines the maximum positioning height of the movable wires. Thanks to the possibility of continually moving the movable wires F' and F'' along the displacement paths defined by the guide portions 4a, 4b, 4c, and 4D, it will be possible to provide an optimal containment of the canopy during the whole period of plant growth. In addition, the pair of wires F''', that are to be placed higher than the pair of wires F', can be moved past the pair of wires F' without interfering with them; in fact, the displacement paths of the pair of wires F''' are parallel and spaced apart from the paths of movement of the pair of wires F'. A fastening device for movable wires built according to the invention allows an operator to move the movable wires F', F'', even independently of one another, according to the most preferred or most appropriate displacement sequence for effectively training the plant canopy. The extent of the vertical displacement of the wires F', F'' can be what is most suitable as needed, thus making the fastening device according to the invention very versatile.

If desired, the guide means 2 can be provided with stop means (not shown in the figures) to temporarily stop the sliding of the mounting means 3 of the movable wires in one or more predefined positions. An exemplary embodiment of such stop means may consist of a plurality of holes provided on each guide portions 4A, 4B, 4C and 4D and a plurality of pins inserted into said holes, said pins interfering with the displacement of the mounting means 3.

Figure 9:
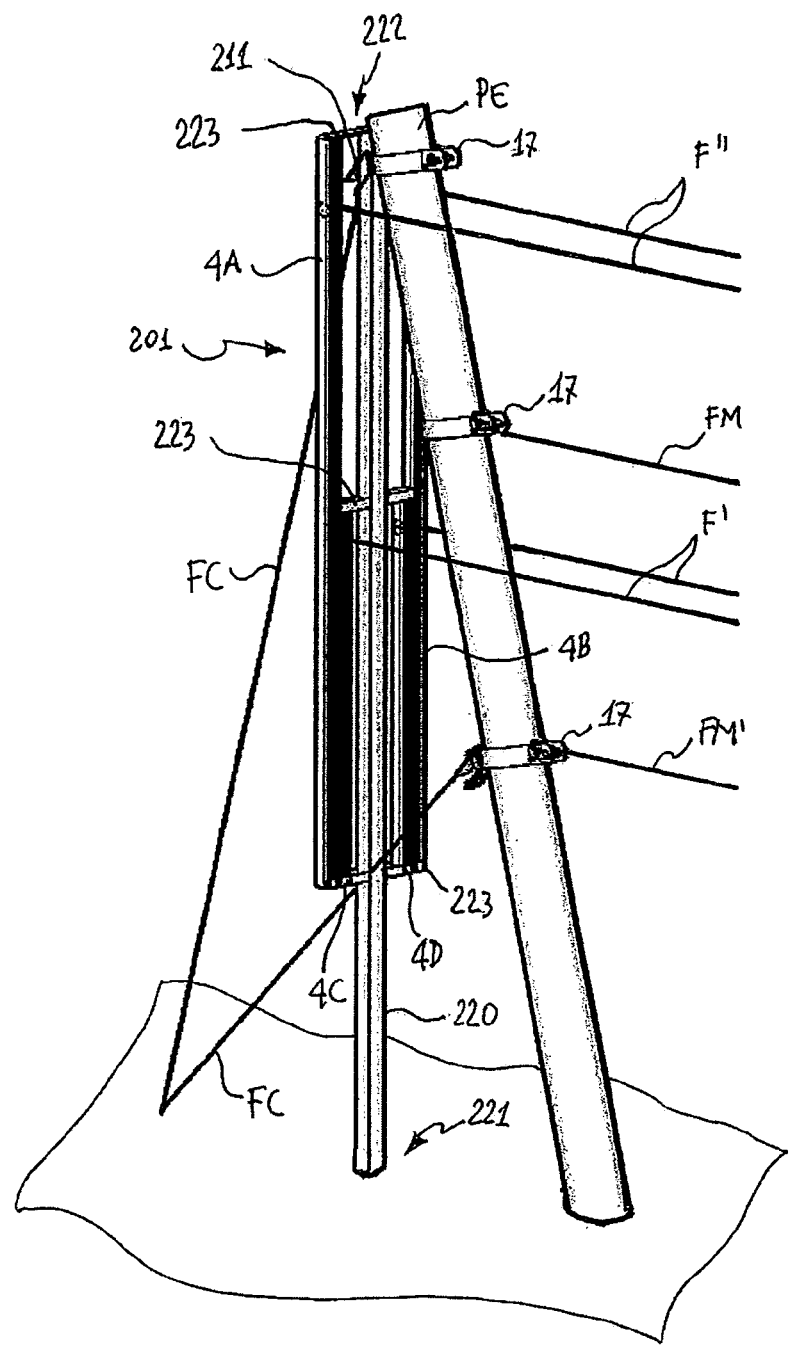
FIG. 9 illustrates a second embodiment of the fastening device for movable wires according to the present invention applied in proximity of a head pole on a row of plants.
Figure 10:
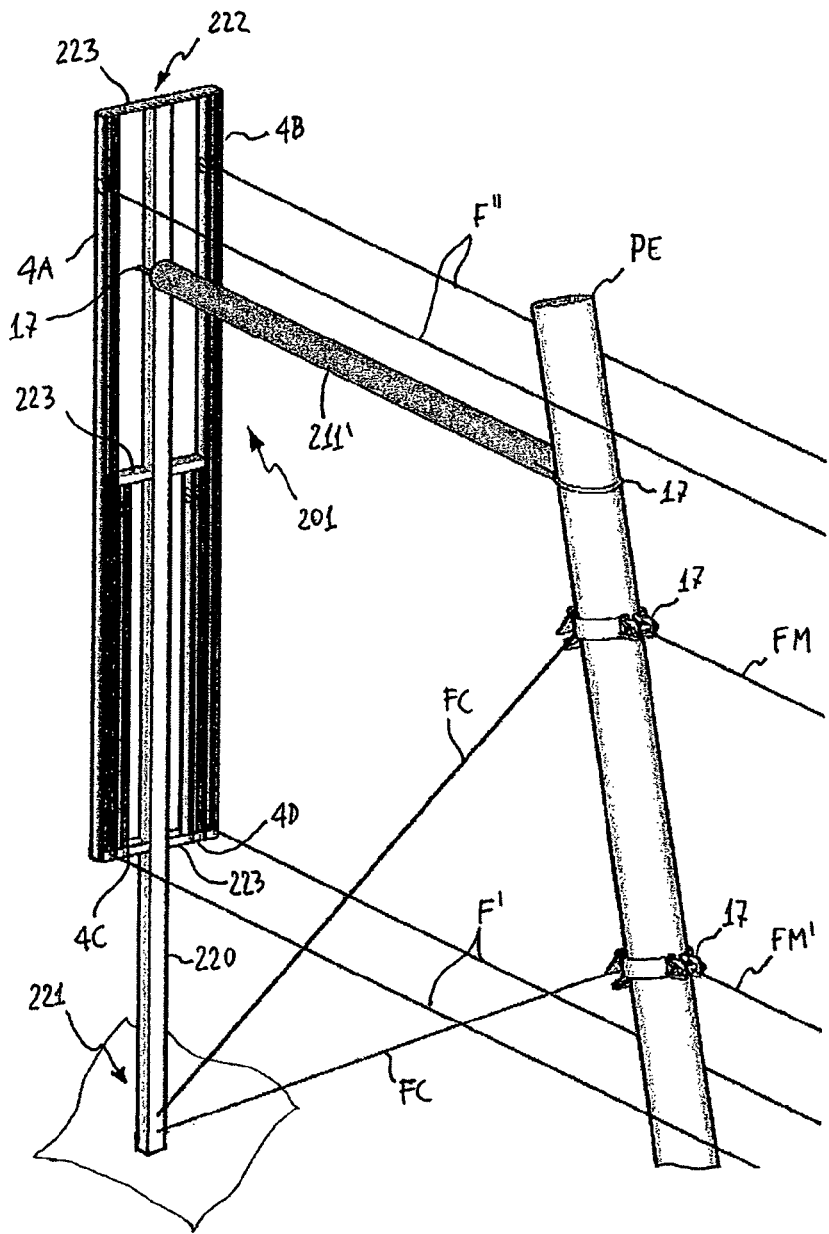
FIG. 10 illustrates the second embodiment of the fastening device for movable wires of FIG. 9 associated with a head pole by means of a counterthrust bracket.
Figure 11:
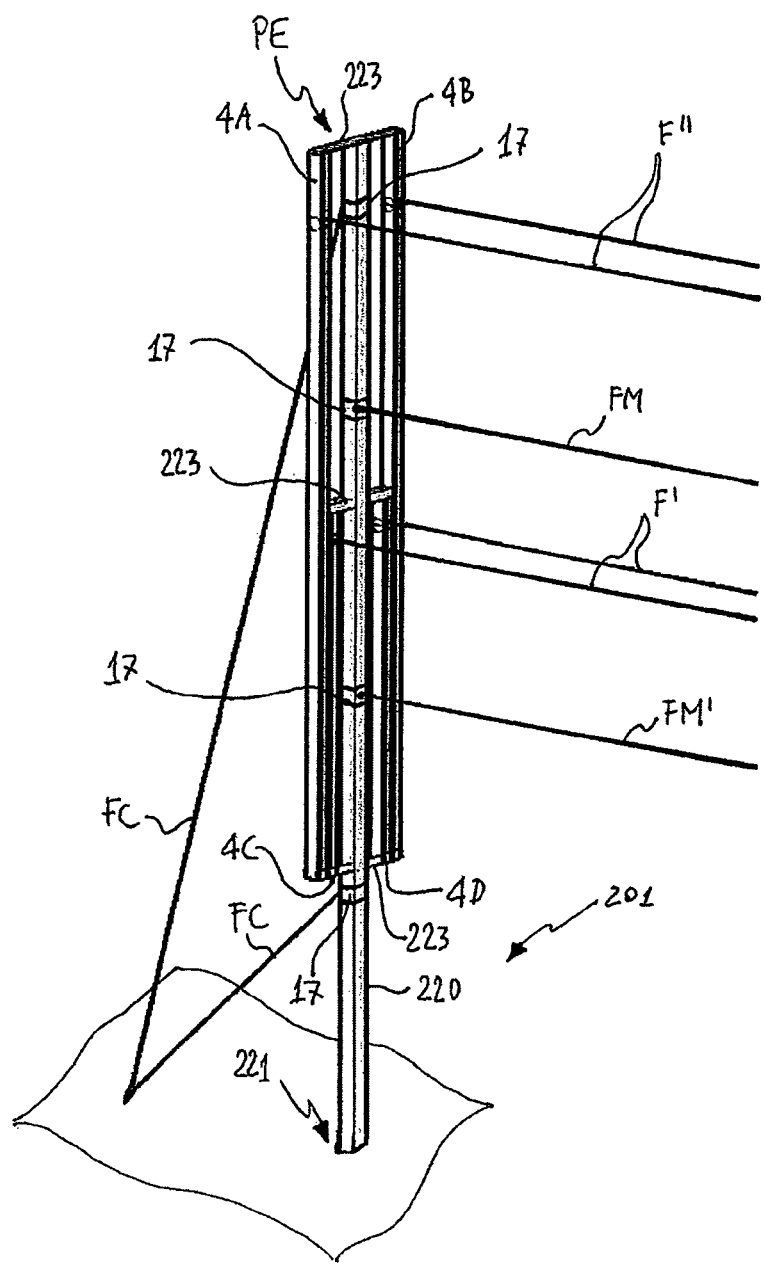
FIG. 11 illustrates the second embodiment of the fastening device of FIG. 9 that incorporates the function of head pole of a row of plants.

FIGS. 9, 10 and 11 illustrate a second embodiment of the fastening device for movable wires according to the invention. In this second embodiment, elements identical to the ones already described with reference to the first embodiment have been indicated with the same numerical symbols, and therefore will not be described further herein. The second embodiment of the fastening device includes a support member 220 having a first end region 222 on which is provided a bracket 211, 211' removably connected to the head pole PE on the row. In this second embodiment, the bracket 211, 211' and said first end portion 221 designed to be driven into the ground make up the connecting means 201 of the fastening device that make it possible to place it in proximity of the head pole PE on the row. The guide portions 4A, 4B, 4C and 4D are arranged so that the pairs of movable wires F' and F'' extend along opposite sides of the row and are displaceable along corresponding displacement paths to contain the canopy that progressively grows from the plants, as described by reference to the first embodiment. Cross elements 223, arranged at the ends of said guide portions 4A, 4B, 4C and 4D, connect the latter to the support member 220 and define the travel limit of the slidable mounting means 3. With particular reference to FIG. 10, the bracket 211' is configured as a bar that extends between a head pole PE and the fastening device, and acts as a strut to balance the traction exerted by the pairs of movable wires F' and F'' on the fastening device. The bracket 211' can be removably fastened to the support member 220 and to the head pole PE by means of collars 17.

FIG. 11 illustrates the second embodiment of the fastening device in which the support member 220 incorporates the function of head pole of a row of plants. The carrying wires FM and FM' can be fastened directly to the support member 220 using, for example, collars 17, and further collars 17 fasten the appropriate bracing wires FC to the support member 220. Since the function of the head pole PE is incorporated in the fastening device, the connecting means 201 that allow it to be arranged near the head pole PE of the row may be made up of only the first end 221, designed to be driven into the ground. According to the configuration of FIG. 11, the fastening device can be used advantageously to set up new rows of plants.

Figure 12:
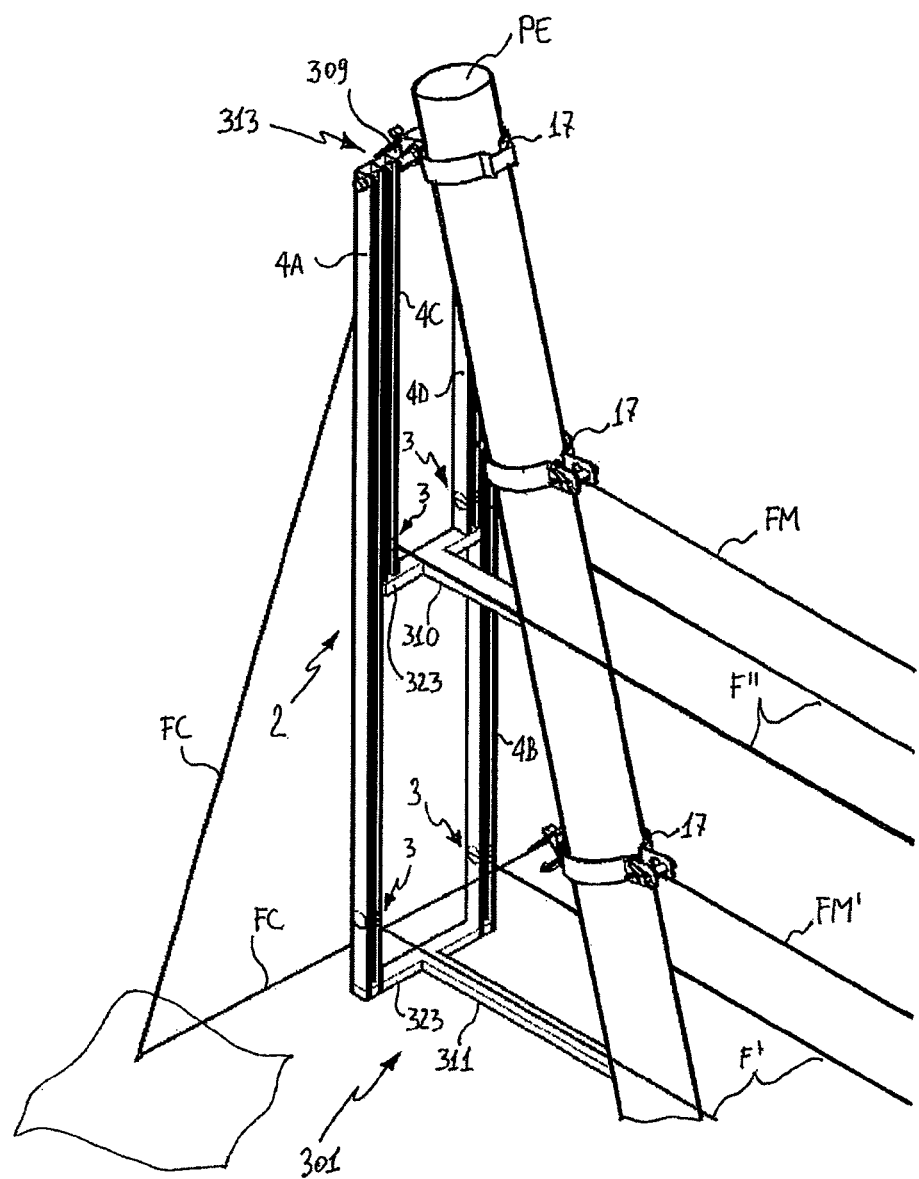
FIG. 12 illustrates a third embodiment of the fastening device for movable wires according to the present invention associated with a head pole.

FIG. 12 illustrates a third embodiment of the fastening device for movable wires according to the invention associated with a head pole PE. In this third embodiment, elements that are identical to those already described with reference to the first and second embodiments have been indicated with the same reference numerals and will not be described further herein.

The guide means 2 include pairs of guide portions 4A, 4B, 4C, 4D having different lengths, and the shorter of the two pairs 4C, 4D is arranged so as to cover a range of adjustment of the height of the movable wires F'' in a region proximate to the carrying wire FM that is farthest from the ground.

The connecting means 301 include a portion 313 rotatably associated with the guide means 2 to allow an operator to arrange the latter in a position substantially at right angles to the longitudinal extension of the movable wires F', F'' along the row. Similarly to what has already been described with reference to the first embodiment, the portion 313 is formed by means of a first bracket 309, consisting for example of a pin, that extends transversely to the guide portions 4A, 4B, 4C and 4D in correspondence of an end portion of the same, which in this case is located in proximity of the top of the head pole PE. A collar 17 rotatably connects the bracket 9 to the head pole PE. Other brackets 310, 311 are provided for in correspondence of the other ends of the guide portions 4C, 4D and 4A, 4B, respectively, to associate the fastening device to the head pole PE. The brackets 310, 311 are advantageously defined by a pair of perpendicular arms arranged in the shape of a "T", in which the cross elements 323 define the travel stop of the mounting means 3 slidingly mounted on the guide means 2. Still more advantageously, in each bracket 310, 311 the reciprocal position of the arms can be adjustable.

Figure 13:
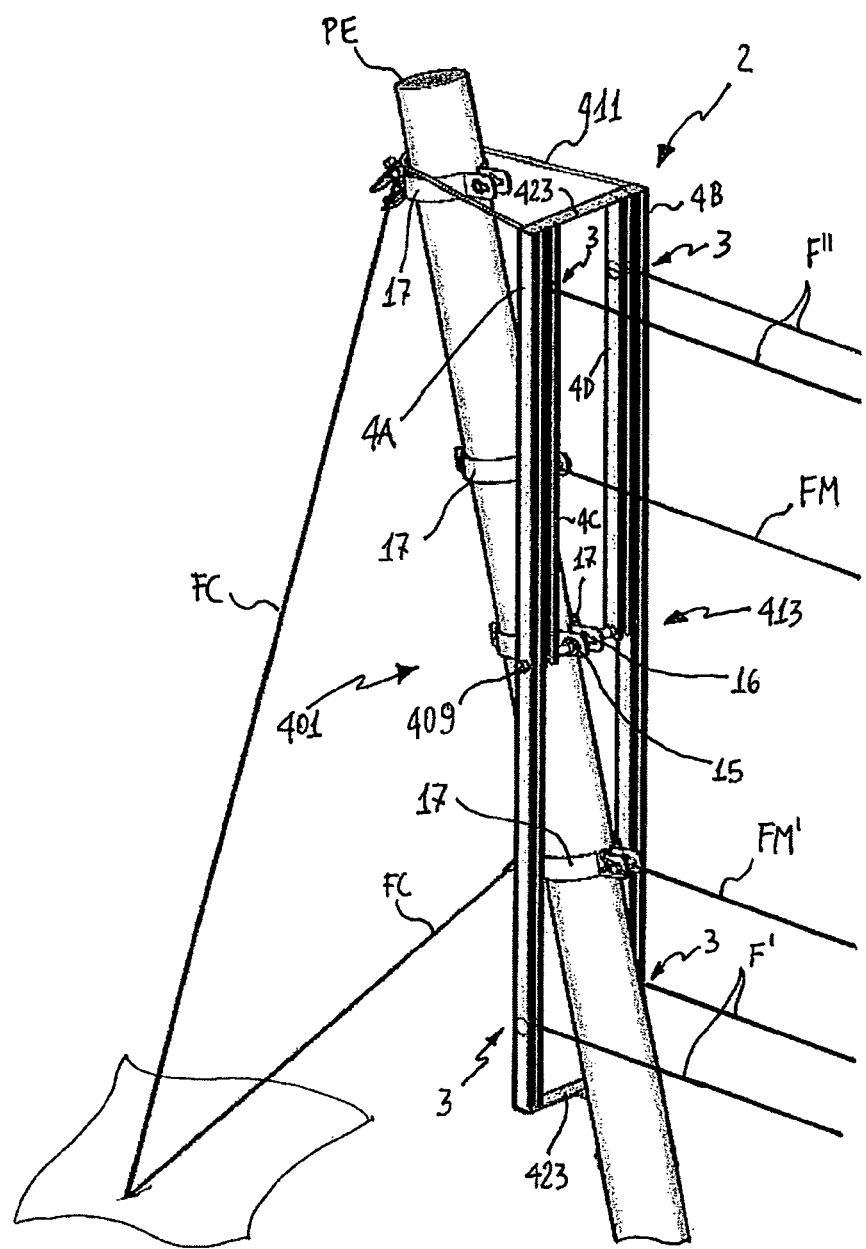
FIG. 13 illustrates a fourth embodiment of the fastening device for movable wires according to the present invention associated with a head pole.

FIG. 13 illustrates a fourth embodiment of the fastening device for movable wires according to the invention associated to a head pole PE. In this fourth embodiment, elements that are identical to those that have already been described with reference to the first, second and third embodiments have been indicated with the same reference numerals and will not be further described here.

Similarly to what was described with reference to the third embodiment, in the fourth embodiment the fastening device is provided with guide means 2 that comprise pairs of guide portions 4A, 4B and 4C, 4D having a different length, and the shorter of the two pairs 4C, 4D is arranged so as to cover a range of adjustment of the height of the movable wires F''' in a region proximate to the carrying wire FM that is farthest from the ground. Cross members 423 are arranged at the ends of the pair 4A, 4B of longer guide portions and at one end of the pair 4C, 4D of shorter guide portions. The cross members 423 associate the pairs of guide portions 4A, 4B and 4C, 4D to each other, and define the travel limit for the mounting means 3 of the movable wires F', F'''.

The connecting means 401 include a portion 413 rotatably associated to the guide means 2 to allow an operator to arrange the latter in a position substantially at right angles to the longitudinal extension of the movable wires F', F''' along the row. In a manner similar to what was already described with reference to the first and to the third embodiment, the portion 413 is made by means of a first bracket 409, consisting for example of a pin, which extends transversally to the guide portions 4A, 4B, 4C and 4D in correspondence of an end region of the pair 4C, 4D of shorter guide portions and a middle region of the pair 4A, 4B of longer guide portions. The first bracket 409 is received within a pair of slots 15, 16 formed in a collar 17 designed to be fastened around a head pole PE, as shown in detail in FIG. 13. The first bracket 409 forms a further travel stop for the movement of mounting means 3 of the movable wires F', F".

A further bracket 411 is provided to be associated to the head pole PE of the row by arranging it directly around it or by means of a further fastening collar 17, which can if necessary be provided with suitable couplings to receive a bracing wire FC as shown in FIG. 13. The connecting means 401 of this fourth embodiment dispose the fastening device astride the head pole PE, which is received between the pairs of guide portions 4A, 4B and 4C, 4D.

For what concerns the configurations of the guide portions 4A, 4B, 4C and 4D, and of the mounting means 3 of the movable wires F', F'" in the second, third and fourth embodiment of the fastening device, as well as for what concerns their operation, reference is made to what has already been described with reference to the first embodiment of the device.

The second embodiment of the present invention was illustrated in FIGS. 9-11 with the shorter guide portions arranged so as to cover a range of adjustment of the height of the movable wires F' in a region proximate to the carrying wire FM' nearest the ground, while the third and fourth embodiment were shown in FIGS. 12 and 13 with the shorter guide portions arranged so as to cover a range of adjustment of the height of the mobile wires F" in a region proximate to the carrying wire FM farthest from the ground. It is evident that simple modifications may be made on the fastening device for movable wires to configure the second embodiment so that the shorter guide portions are arranged so as to cover a range of adjustment of the height of the movable wires F' in a region proximate to the carrying wire FM that is farthest from the ground, and vice versa the third and fourth embodiments can be modified so as to arrange the shorter guide portions so as to cover a range of adjustment of the height of the movable wires F" in a region proximate to the carrying wire FM' that is nearest the ground.

It was thus established that the invention achieved the preset objective and purposes, there having been provided a fastening device for movable wires of a row of plants, in particular grape vines, that makes it possible to manage with equal effectiveness the vegetation produced by all the vines in the row, even if they are located in proximity of the head poles. The device according to the invention allows the displacement of each movable wire independently of all the others in a wide range of heights without interfering with the fixed wires, or the carrying wires of the row. According to the invention, the height of each movable wire relative to the ground can be varied, passing over other movable wires previously placed at a preset height, without interfering with them and without first having to move them. Advantageously, the invention enables even a single operator to carry out the adjustment of the height of the movable wires, without the need of any tool.

The embodiments of a fastening device for movable wires of a row of plants, in particular grape vines, according to the present invention are certainly not limited to that shown in the enclosed drawings but they may consist of multiple embodiments, all comprised within the scope of the appended claims. Moreover, the materials as well as the dimensions of the individual components can be the most suitable to fit the specific requirements.

The invention claimed is:

1. Fastening device for fastening movable wires for supporting a row of plants between a pair of head-poles, said device comprising:
   - connectors for securing said device to a respective head-pole of said row,
   - a plurality of guides, each defining a displacement path oriented transversely to the direction of extension of said movable wires, and
   - a plurality of wire mounting means that are slidably disposed in respective ones of said guides,
   - said guides being arranged on either side of said row of plants, so that said movable wires are distributed on mutually opposing sides of the plant row, wherein
   - each of the guides is a structural section having two facing walls with bent inward flanges which form respective sliding paths or wherein the outermost surface of the section forms one or more sliding paths and
      - each of said wire mounting means includes a pair of rolling members disposed in said sliding paths and coupled to a shaft which receives an end of a respective one of said wires, or sliding bodies that slide along said paths, and
   - each of said wire mounting means receives only one of said movable wires such that each of said movable wires is able to slide independently along one of said displacement paths.

2. Fastening device according to claim 1, wherein plural wire mounting means are slidably associated with a same guide.

3. Fastening device according to claim 1, wherein said wire mounting means are continuously movable between a first position, which defines a minimum positioning height of said movable wires, and a second position, which defines a maximum positioning height of said movable wires.

4. Fastening device according to claim 1, wherein each said guides are formed of profile sections each defining plural sliding paths, and wherein said wire mounting means comprise rolling members or sliding members which are adapted to engage said sliding paths.

5. Fastening device according to claim 1, wherein said wire mounting means comprise a wire-stretching device.

6. Fastening device according to claim 1, wherein said guides comprise a first pair and a second pair of guide portions, said first pair of guide portions having a length that is greater than the length of said second pair of guide portions.

7. Fastening device according to claim 1, wherein each of said guides comprise stop means that are adapted to stop the sliding movement of said wire mounting means at one or more pre-defined positions.

8. Fastening device according to claim 1, wherein said connectors comprise one or more brackets that are removably associated to said guides, said brackets being provided to associate said fastening device to the head-pole of the row.

9. Fastening device according to claim 1, wherein said connectors comprise a portion that is rotatably associated to said guides.

10. Fastening device according to claim 1, further comprising a supporting member provided with an end portion that is adapted to be driven into the ground.

11. Fastening device according to claim 1, further comprising cross-members provided at the ends of said guides, said cross-members defining an end-of-stroke provision for said wire mounting means.

* * * * *